United States Patent
Toyoda

[19]

[11] Patent Number: 5,808,189
[45] Date of Patent: Sep. 15, 1998

[54] FAILURE DIAGNOSIS CONTROLLER OF PRESSURE SENSOR

[75] Inventor: Katsuhiko Toyoda, Shizuoaka-ken, Japan

[73] Assignee: Suzuki Motor Corporation, Shizuoka-ken, Japan

[21] Appl. No.: 820,783

[22] Filed: Mar. 19, 1997

[30] Foreign Application Priority Data

Mar. 29, 1996 [JP] Japan ................................ 8-104214

[51] Int. Cl.⁶ .................................................. F02M 25/07
[52] U.S. Cl. ........................................................ 73/118.2
[58] Field of Search .......................... 73/115, 116, 117.2, 73/117.3, 118.1, 118.2, 49.7; 123/568, 571, 676; 364/424.039

[56] References Cited

U.S. PATENT DOCUMENTS

| | | | |
|---|---|---|---|
| 4,537,065 | 8/1985 | Ootsuka et al. | 73/117.3 |
| 4,541,386 | 9/1985 | Kishi et al. | 123/479 |
| 4,967,717 | 11/1990 | Miyazaki et al. | 123/571 |
| 4,969,104 | 11/1990 | Suzuki et al. | 73/116 X |
| 5,125,267 | 6/1992 | Kuroda et al. | 73/115 |
| 5,349,936 | 9/1994 | Uchinami | 73/117.3 X |
| 5,469,735 | 11/1995 | Watanabe | 73/117.3 X |
| 5,617,337 | 4/1997 | Eidler et al. | 73/115 X |
| 5,635,633 | 6/1997 | Kadota | 73/118.1 |

FOREIGN PATENT DOCUMENTS 6-58210  3/1994  Japan .

*Primary Examiner*—George M. Dombroske
*Assistant Examiner*—Paul D. Amrozowicz
*Attorney, Agent, or Firm*—Flynn, Thiel, Boutell & Tanis, P.C.

[57] ABSTRACT

A failure diagnosis controller of a pressure sensor whereby abnormalities of the pressure sensor can precisely be diagnosed, wrong abnormality diagnoses can be avoided, users' perplexity and confusion on maintenance avoided, users' distrust removed, and unnecessary maintenance eliminated. The invention provides a control means which diagnoses the pressure sensor to be in a failure mode when the intake air temperature is in a state of being measured and the integrated load of the internal combustion engine from its starting time exceeds the criterion of the integrated load.

13 Claims, 13 Drawing Sheets

| PRESSURE(mmHg) | $P_1$-600 | $P_2$-160 | $P_2$-$P_1$/50mmHg |
|---|---|---|---|
| CENTER VOLTAGE (V) | 1.16 | 3.8 | 0.30 |
| COMMON DIFFERENCE | ±0.8 | ±0.8 | ±0.013 |

FAILURE DIAGNOSIS CONTROLLER OF PRESSURE SENSOR

FIELD OF THE INVENTION

The present invention relates to a failure diagnosis controller of a pressure sensor and, more particularly, to a failure diagnosis controller of a pressure sensor capable of precisely diagnosing abnormalities of a relative pressure sensor mounted on an intake system of an internal combustion engine.

BACKGROUND OF THE INVENTION

In an internal combustion engine, sensors such as a pressure sensor for detecting intake manifold pressure and a temperature sensor for detecting intake air temperature are mounted on the intake system so as to diagnose an operational state of the internal combustion engine. The foregoing pressure sensor includes a relative pressure sensor used for detecting a variation of an intake manifold pressure of an exhaust gas recirculation system (EGR system) at its on-off operation, in order to diagnose whether the EGR system is or is not in a normal operational state. As shown in FIGS. 17 and 18, the relative pressure sensor has a characteristic such that it gives a specific output voltage (V) against an input pressure (mmHg), and there is a specific dispersion or pattern to the characteristics, as shown in FIG. 19.

As shown in FIG. 19, the relative pressure sensor represents the characteristics that the input pressure is high when the engine load is high, and the input pressure is low when the engine load is low. Accordingly, in the relative pressure sensor the operational state is diagnosed to be abnormal when the output voltage is 0.5 volts or less where the engine load is "a" or more, and when the output voltage is 4.5 volts or more where the engine load is "b" or less (areas shown with cross hatching in FIG. 19).

A method of diagnosing a failure of such a pressure sensor is disclosed, for example, in Japanese patent publication JP-A-6-58210. The method disclosed in this patent publication is to prevent a misdiagnosis due to an abnormal state or mode, for example a freezing of the pressure sensor, by providing a judgment step to judge whether or not at least one of a coolant water temperature, intake air temperature, and oil temperature at starting of the engine is lower than a predetermined value corresponding to the lower limit temperature in a normal operational state of the pressure sensor system, and thus invalidating a failure diagnosis execution step when at least one of these three temperatures is lower than the predetermined value.

However, an abnormality of the pressure sensor can not be precisely diagnosed by the aforesaid conventional diagnosis method, and increasing the aforementioned judgment voltages, 0.5 volts and 4.5 volts, raise the probability of a misdiagnosis, which is disadvantageous. The failure of the pressure sensor includes some deviations in the characteristics, although the voltage is produced from the pressure sensor. This situation makes it impossible to diagnose an abnormality of the pressure sensor, which is also disadvantageous.

Furthermore, when moisture penetrates into a hose communicating with the pressure sensor and intake system due to accidents in an extremely cold region and the moisture freezes, the pressure sensor is likely to be diagnosed as abnormal and the EGR system can be misdiagnosed as abnormal.

Still further, if the pressure sensor is diagnosed as normal in spite of the characteristics of the pressure sensor being abnormal, the EGR system for diagnosing abnormalities using this pressure sensor will diagnose itself as abnormal. Accordingly, some parts can be replaced from the normal EGR system, and unnecessary maintenance can be done with the true cause being unknown, thereby increasing the maintenance cost, thus amplifying distrust of users, which is another disadvantage.

SUMMARY OF THE INVENTION

The present invention has been made in view of solving the foregoing problems, and it is characterized in that the invention provides a control means for a failure diagnosis of a pressure sensor to measure an intake manifold pressure of an internal combustion engine. The control means diagnoses the pressure sensor to be in a failure mode when intake air temperature is in a state of being measured and an integrated load of the internal combustion engine from the engine starting time exceeds a criterion of the integrated load.

The failure diagnosis controller of this invention diagnoses that the pressure sensor has gone into a failure mode when the intake air temperature is in a state of being measured and the integrated load of the internal combustion engine from the starting time exceeds a criterion of the integrated load; and therefore, abnormalities of the pressure sensor can be diagnosed with high precision, misdiagnosis of abnormalities can be avoided, confusions regarding maintenance and distrust of users can be removed, and still unnecessary maintenance can be eliminated.

DETAILED DESCRIPTION

Figure 20:
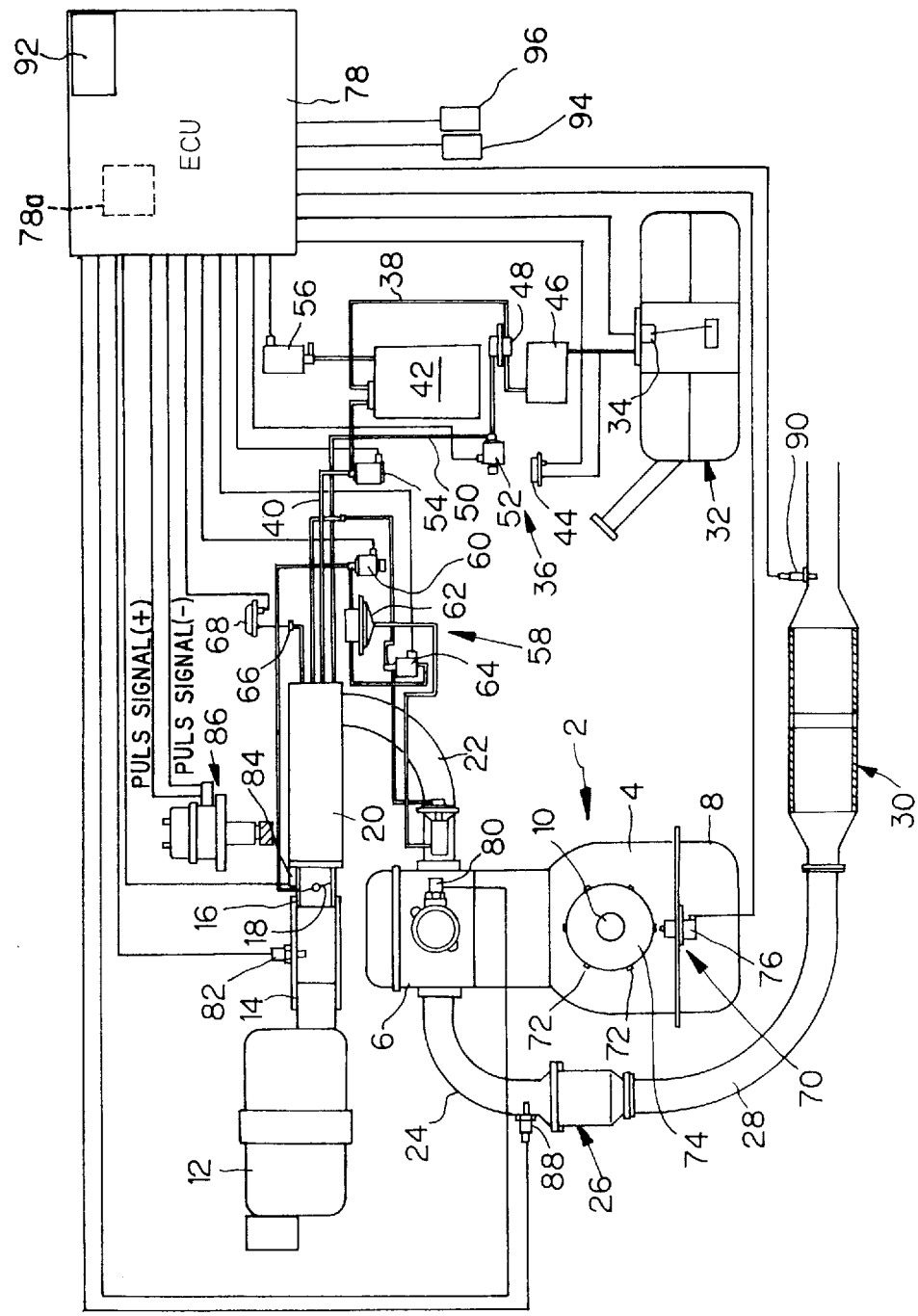
FIG. 20 is a systematic structural diagram, illustrating an engine with a failure-diagnosing controller.

The embodiment of this invention will hereafter be described with reference to the accompanying drawings. FIG. 20 shows an internal combustion engine 2 installed in a vehicle (not illustrated), which engine includes a cylinder block 4, a cylinder head 6, an oil pan 8, a crankshaft 10, an air cleaner 12, an intake pipe 14, a throttle body 16, a throttle valve 18, a surge tank 20, an intake manifold 22, an exhaust manifold 24, a front catalytic converter 26, an exhaust pipe 28, a rear catalytic converter 30, and a fuel tank 32. The fuel tank 32 is provided with a level gauge 34.

An evaporative fuel controller 36 is provided between the surge tank 20 and the fuel tank 32. In the evaporative fuel controller 36, a canister 42 is provided between an evaporative fuel passage 38 communicating with the fuel tank 32 and a purge passage 40 communicating with the surge tank 20. In sequence from the fuel tank 32, a tank inner pressure sensor 44, a separator 46, and a pressure control valve 48 are provided in the evaporative fuel passage 38. The pressure control valve 48 communicates with the surge tank 20 through a pressure passage 50. The pressure passage 50 is provided with a negative pressure control valve 52. The purge passage 40 is provided with a purge valve 54. The canister 42 is provided with an atmospheric control valve 56.

In the intake system of the internal combustion engine 2, an exhaust gas recirculation (EGR) unit 58 is provided which supplies the intake system with a portion of an exhaust gas. The EGR unit 58 includes an EGR control valve 60, a back pressure regulating valve 62, and an EGR judgment valve 64.

Figures 17, 18:
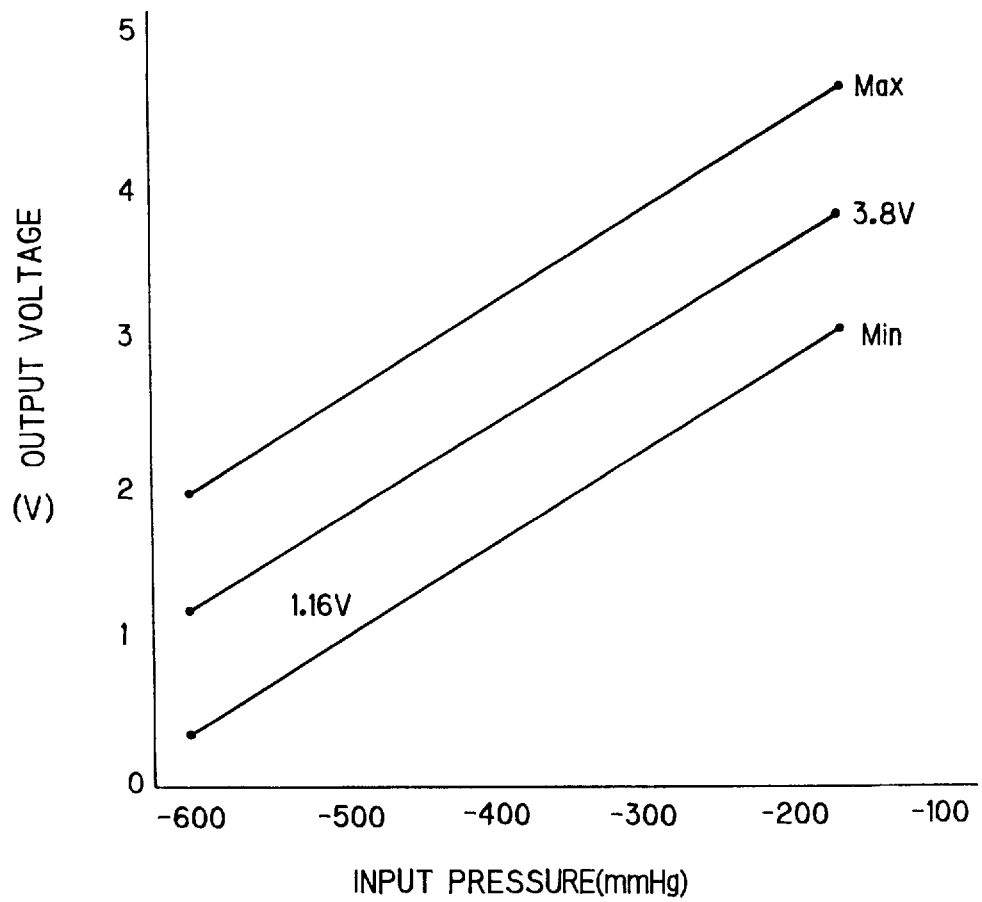
FIG. 17 is a characteristic illustration showing the output characteristics of the relative pressure sensor.
FIG. 18 is a characteristic illustration showing the characteristics of output voltage of the relative pressure sensor.
Figure 19:
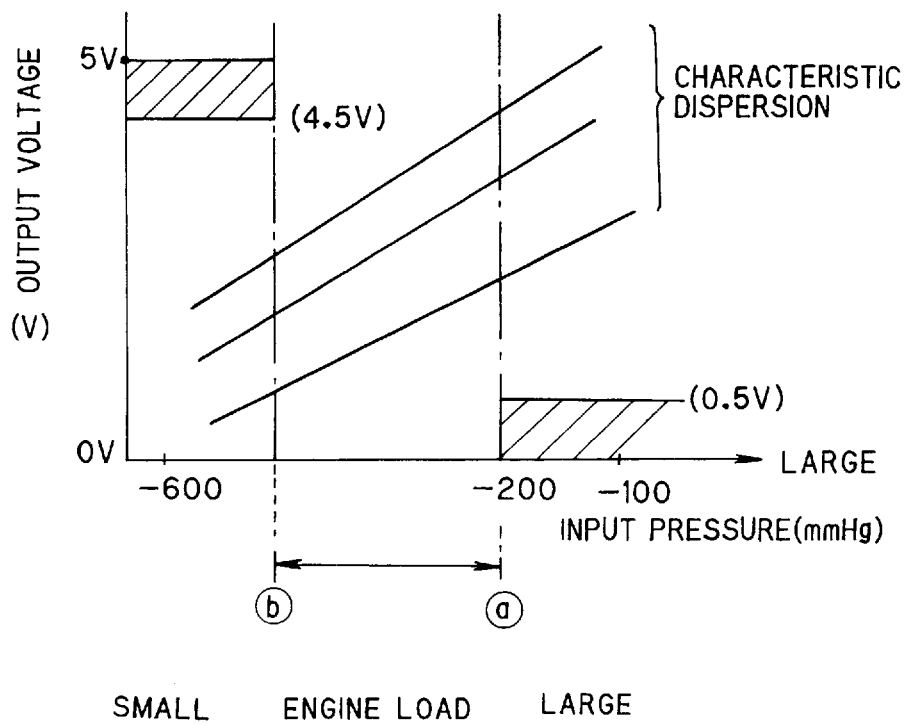
FIG. 19 is a characteristic illustration of the relative pressure sensor.

The surge tank 20 is provided through a filter 66 with a relative pressure sensor 68 for detecting an intake manifold pressure. The relative pressure sensor 68 outputs a characteristic, specific output voltage (V) against an input pressure (mmHg), as shown in FIGS. 17–19.

The internal combustion engine 2 is provided with a crank angle sensor 70. The crank angle sensor 70 also functions as an engine speed sensor and comprises a crank angle plate 74 having a plurality of teeth 72 on the periphery thereof, fitted on the crankshaft 10, and an electromagnetic pickup 76 mounted on the cylinder block 4. The crank angle sensor 70 communicates with an electronic control unit or means (ECU) 78.

The control means 78 communicates with a coolant temperature sensor 80 mounted on the cylinder head 6, an intake air temperature sensor 82 mounted on the intake pipe 14, a throttle travel sensor 84 mounted on the throttle body 16, an ignition unit 86, the level gauge 34, the relative pressure sensor 68, the tank inner pressure sensor 44, the negative pressure control valve 52, the atmospheric control valve 56, the purge valve 54, the EGR control valve 60, the EGR judgment valve 64, a front oxygen sensor 88 mounted on the exhaust manifold 24, a rear oxygen sensor 90 mounted on the exhaust pipe 28 on the downstream of the rear catalytic converter 30, an atmospheric pressure sensor 92 for detecting the atmospheric pressure, an ignition key 94, and a starter 96. The control means 78 is provided with a failure diagnosis unit 78a therein.

The control means 78 diagnoses the relative pressure sensor 68 to be in a failure mode when intake air temperature is in a state of being measured and an integrated load from the starting of the internal combustion engine 2 exceeds a criterion of the integrated load.

The control means 78 further diagnoses that the relative pressure sensor 68 is in a disconnection or short-circuit mode when an intake manifold pressure is not within a range between a higher limit and a lower limit of the criterion range, and that the relative pressure sensor 68 is in a functional abnormality mode when a pressure variation against an engine load variation is outside the criterion range.

Furthermore, the control means 78 measures the intake manifold pressure when the ignition key is ON, measures an atmospheric air pressure, measures a first pressure when the starter 96 turns ON from OFF, and measures a second pressure at a complete explosion within the cylinder when the starter 96 turns OFF from ON. The control means diagnoses that the relative pressure sensor 68 is disconnected when the intake manifold pressure is lower than the reference criterion. The control means diagnoses that the relative pressure sensor 68 is short-circuited when the first pressure is lower than a first criterion value or the second pressure is lower than a second criterion value. The control means diagnoses that the relative pressure sensor 68 is functionally abnormal when the first pressure is lower than a third criterion value or the second pressure is lower than a fourth criterion value. The control means sets a correction factor on the basis of the intake manifold pressure and atmospheric air pressure, and sets a corrected input pressure on the basis of an input pressure of the relative pressure sensor 68 and the foregoing correction factor. The control means also diagnoses that the relative pressure sensor 68 is short-circuited when an output voltage is higher than a lower limit for judgment when fuel is not being supplied, and diagnoses that the relative pressure sensor 68 is disconnected when an engine load is higher than a set value or the output voltage is lower than a higher limit for judgment.

The control means 78 also measures the intake air temperature when a vehicle speed continues for a specific length of time or more with a set vehicle speed, measures the intake air temperature each time when the vehicle speed satisfies the foregoing specific length of time, and performs a statistical processing of the intake air temperature.

Furthermore, the control means 78 delays the diagnosis of the relative pressure sensor 68 from the starting of the internal combustion engine 2 depending on the integrated load, and varies the criterion range of the integrated load according to the intake air temperature.

The operation of this embodiment will now be described with reference to the flow chart shown in FIG. 1.

When the internal combustion engine 2 is started (step 102), first, whether or not the intake air temperature sensor 82 can measure the intake air temperature is judged (step 104). If step 104 gives YES, a measurement process of the intake air temperature is executed (step 106).

Figure 2:
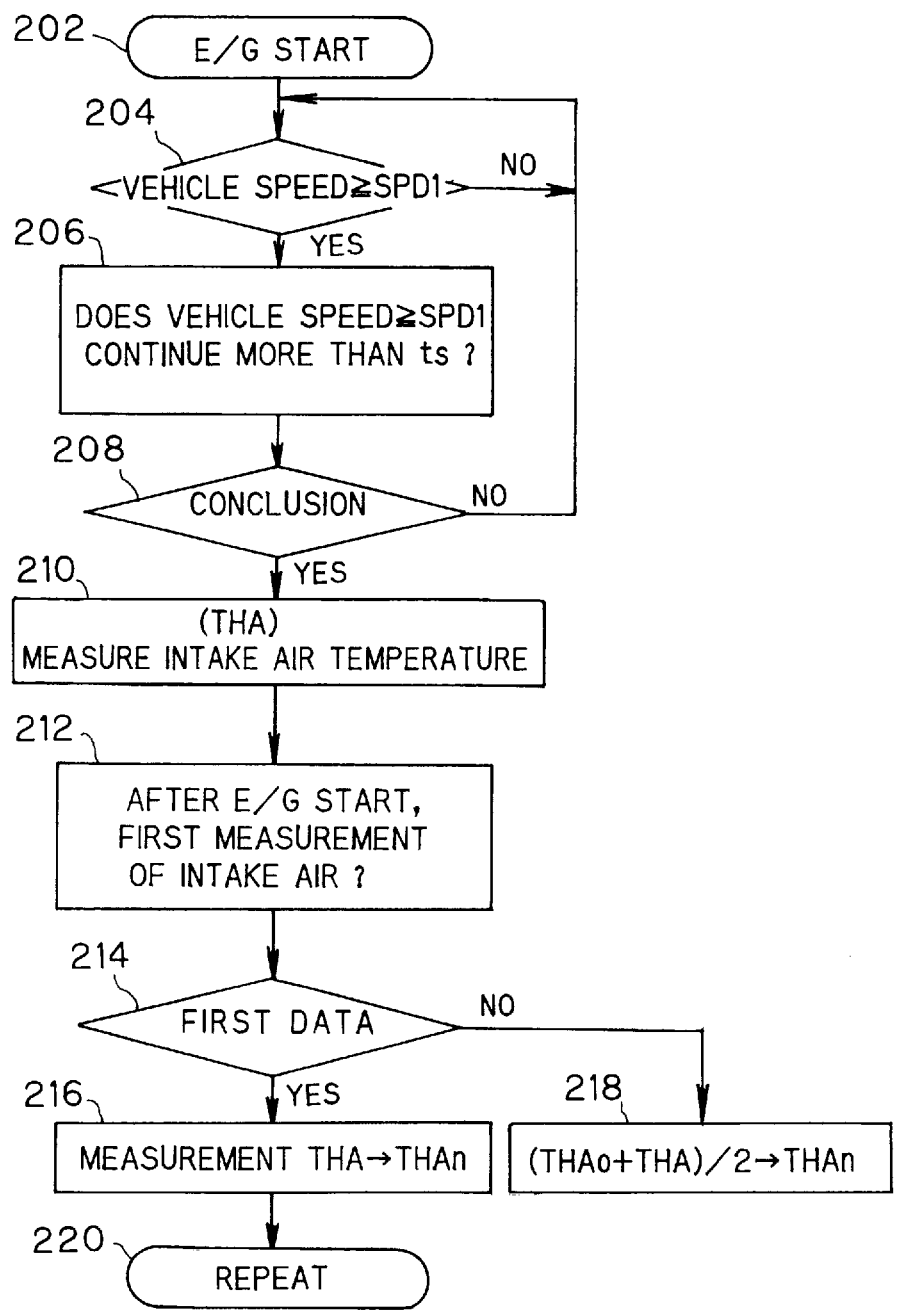
FIG. 2 is a flow chart illustrating how an intake air temperature is measured successfully.

The measurement process of the intake air temperature in step 106 is executed according to the flow chart shown in FIG. 2. When, the internal combustion engine 2 starts running and starts the program (step 202), first, whether or not the vehicle speed (SPD) (hereinafter simply referred to as the speed) is higher than the speed criterion (SPD1) being the set speed, that is, SPD≧SPD1 is judged (step 204). If step 204 gives NO, this judgment process is continuously repeated.

If step 204 gives YES, a judgment process on the condition whether or not the state of SPD≧SPD1 continues more than a specific length of time (ts) is prepared (step 206), and the next step 208 concludes whether the condition is satisfied. This is to prevent that a correct measurement of the intake air temperature becomes impossible when the ambient temperature around the intake air temperature sensor 82 increases owing to an idling engine running left alone (i.e., a non-moving vehicle). If step 208 gives NO, the process returns to step 204.

If step 208 gives YES, the intake air temperature is measured and the measured intake air temperature (THA) is obtained (step 210).

After the internal combustion engine 2 starts running, the judgment whether or not the first intake air temperature measurement is done is prepared (step 212), and the next step 214 judges whether or not the measured data is the first measurement of the intake air temperature. If step 214 gives YES, the measured intake air temperature (THA) is specified as an intake air temperature (THAn) that is employed for correction (step 216). On the other hand, if step 214 gives NO, the intake air temperature used for correction (THAn) is specified as (THA○+THA)/2→THAn; here, THA○ is the intake air temperature used for the previous correction and THA is the currently measured intake air temperature (step 218).

After steps 216 and 218 are processed, the intake air temperature measurement process is repeated (step 220).

Figure 3:
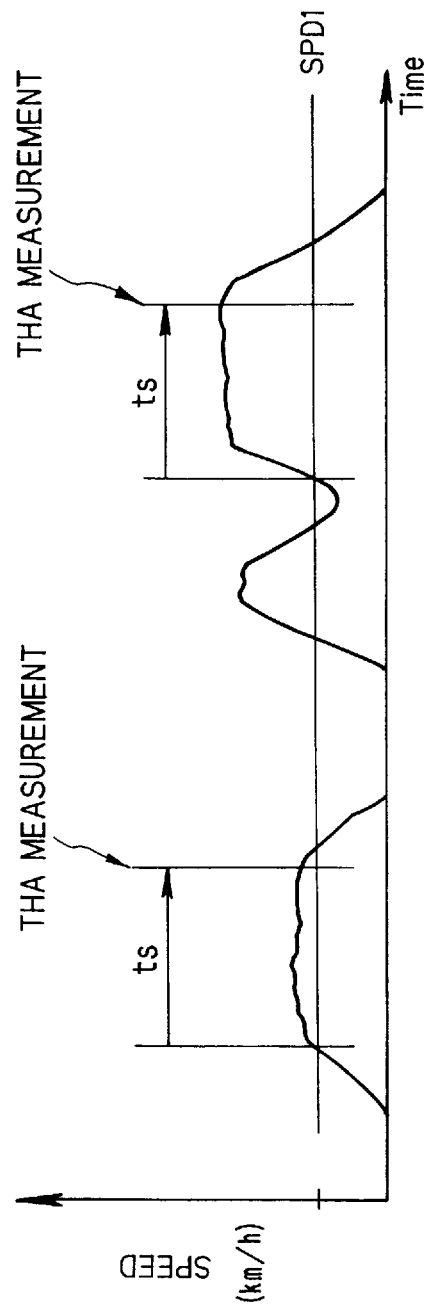
FIG. 3 is an illustration showing a relationship between a vehicle's velocity and the intake air temperature.

Therefore, in the intake air temperature measurement process in FIG. 2, the intake air temperature is measured when the speed (SPD) is more than the speed criterion (SPD1) and continues for more than the specified length of time (ts), as shown in FIG. 3, and the intake air temperature measurement is done each time when the foregoing condition is satisfied and the statistical processing thereof is performed.

Figure 1:
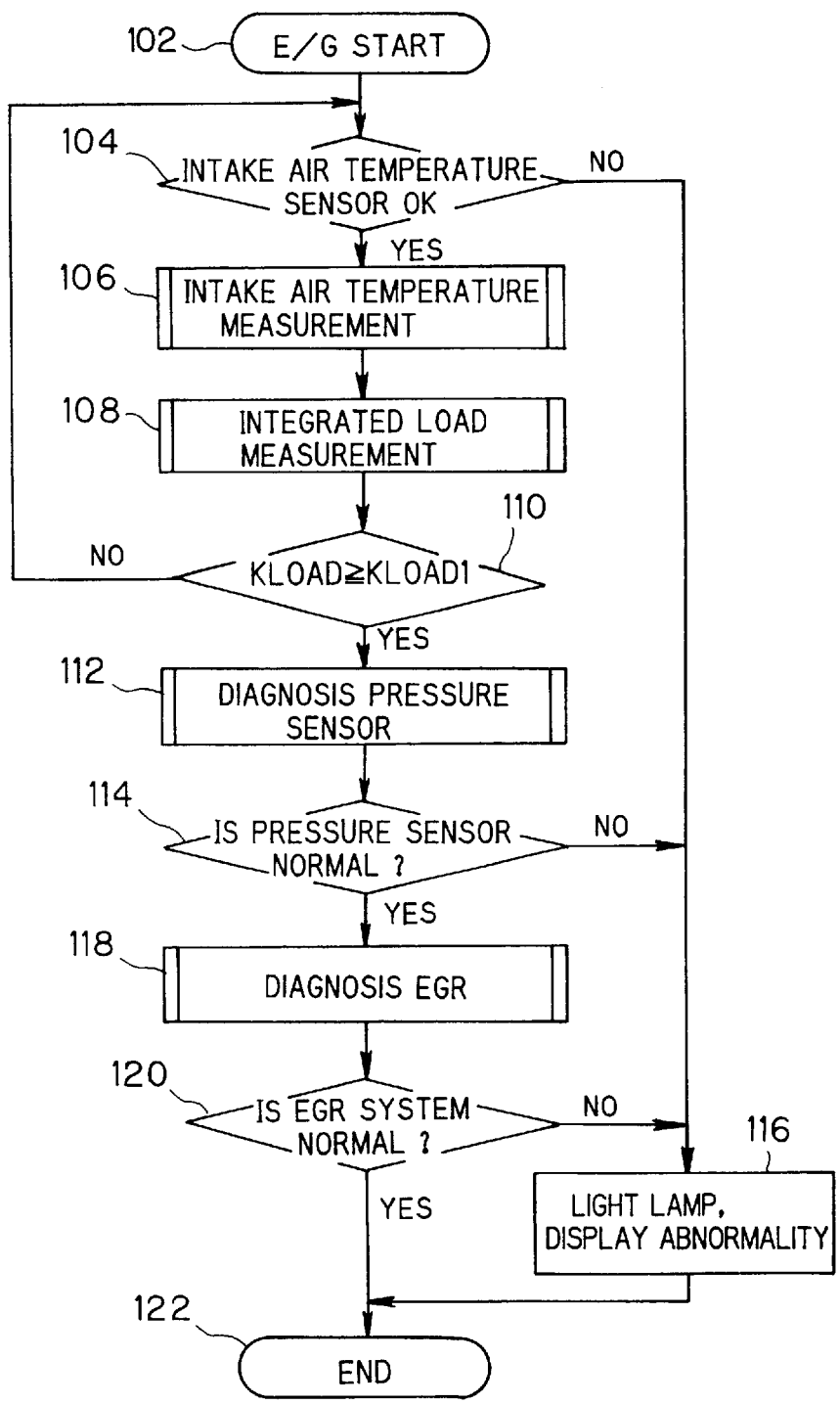
FIG. 1 is a flow chart illustrating an overall failure diagnosis procedure in a relative pressure sensor.
Figure 4:
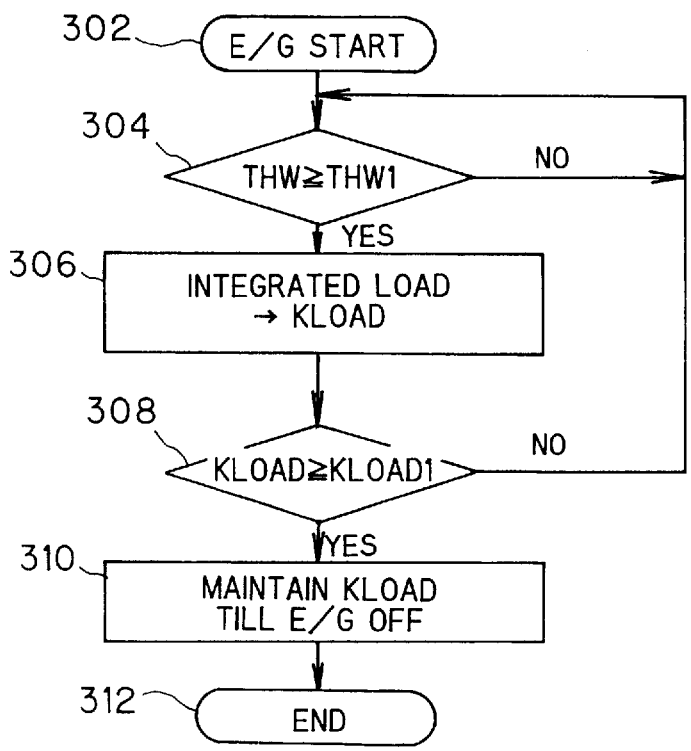
FIG. 4 is a flow chart illustrating how an accumulated load is measured successfully.

Next, in FIG. 1, after the intake air temperature measurement (step 106), an integrated load measurement is done (step 108). The integrated load measurement of step 108 is performed according to a flow chart as shown in FIG. 4.

When the internal combustion engine 2 starts running and starts the program (step 302), first, whether the coolant temperature (THW) is higher than a criterion of the coolant temperature (TWH1) which is a set temperature, that is the equation THW≧THW1, is judged (step 304). If step 304 gives NO, this judgment process is continuously repeated.

Figure 5:
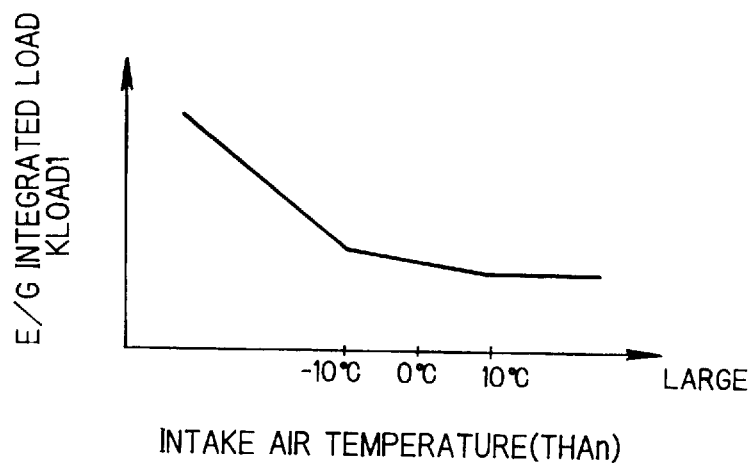
FIG. 5 is an illustration showing a relationship between the intake air temperature and an accumulated load quantity.
Figure 6:
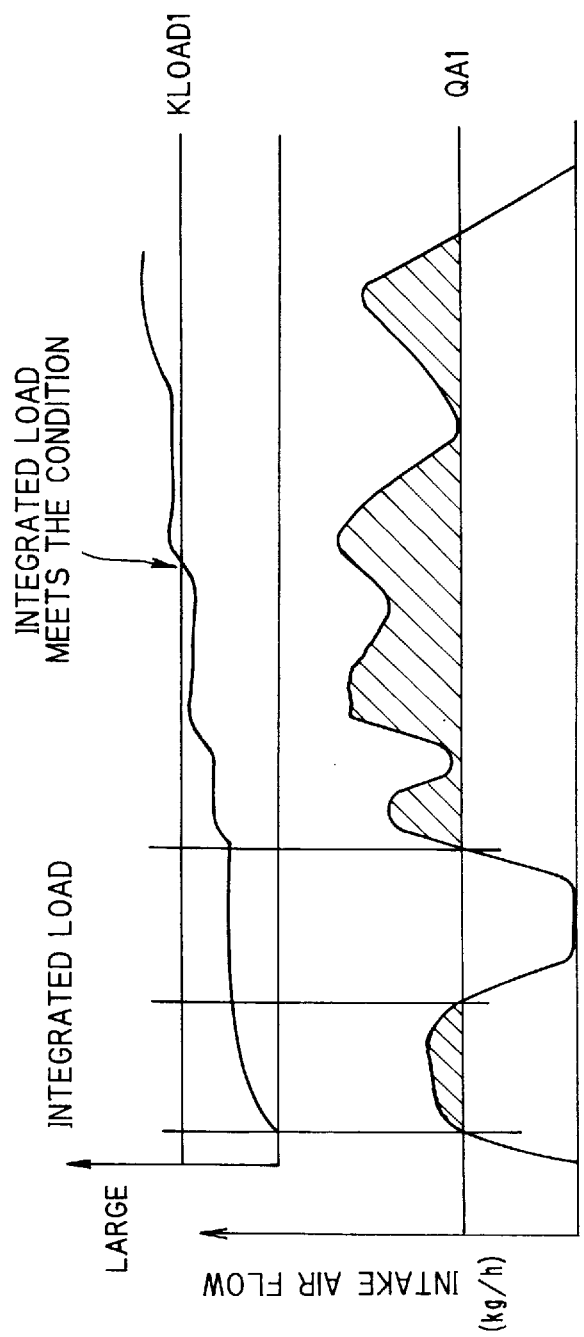
FIG. 6 is an illustration showing a relationship between an intake air quantity and the accumulated load quantity.

If step 304 gives YES, the engine load of the internal combustion engine 2 is integrated by the control means, and thus the quantity of the integrated load (value of the integrated load) (KLOAD) is acquired (step 306). The integrated load (KLOAD) is obtained, for example, from an intake air flow as shown in FIG. 6. The integrated load (KLOAD) thus obtained is judged whether it is more than a criterion (KLOAD1) of the integrated load (step 308). The criterion (KLOAD1) of the integrated load is determined depending on the state of the intake air temperature used for correction (THAn) as described above, and as shown in FIG. 5. If step 308 gives NO, the step returns to step 304.

If step 308 gives YES, the integrated load (KLOAD) is maintained until the internal combustion engine 2 stops (step 310), and step 312 ends the program.

Therefore, in the integrated load measurement process in FIG. 4, the diagnosis of the relative pressure sensor 68 is delayed from the starting of the internal combustion engine 2 by means of the integrated load (KLOAD), and in the meantime the diagnosis is not executed. This is to avoid misjudgment even if moisture in a hose (not illustrated) communicating the relative pressure sensor 68 with the intake system freezes in extremely cold weather. The criterion of the integrated load (KLOAD1) by the intake air temperature is set with a sufficient time delay to melt the frozen moisture.

Next, after the integrated load measurement (step 108), the integrated load (KLOAD) is compared with the criterion of the integrated load (KLOAD1), and whether the equation KLOAD≧KLOAD1 is satisfied is judged (step 110). If step 110 gives NO, the step returns the process to step 104.

If step 110 gives YES, the relative pressure sensor 68 is diagnosed (step 112). For example, the flow chart shown in FIG. 7 as Example 1, or the flow chart shown in FIG. 12 as Example 2, can be applied to the diagnosis of the relative pressure sensor 68.

Figure 7:
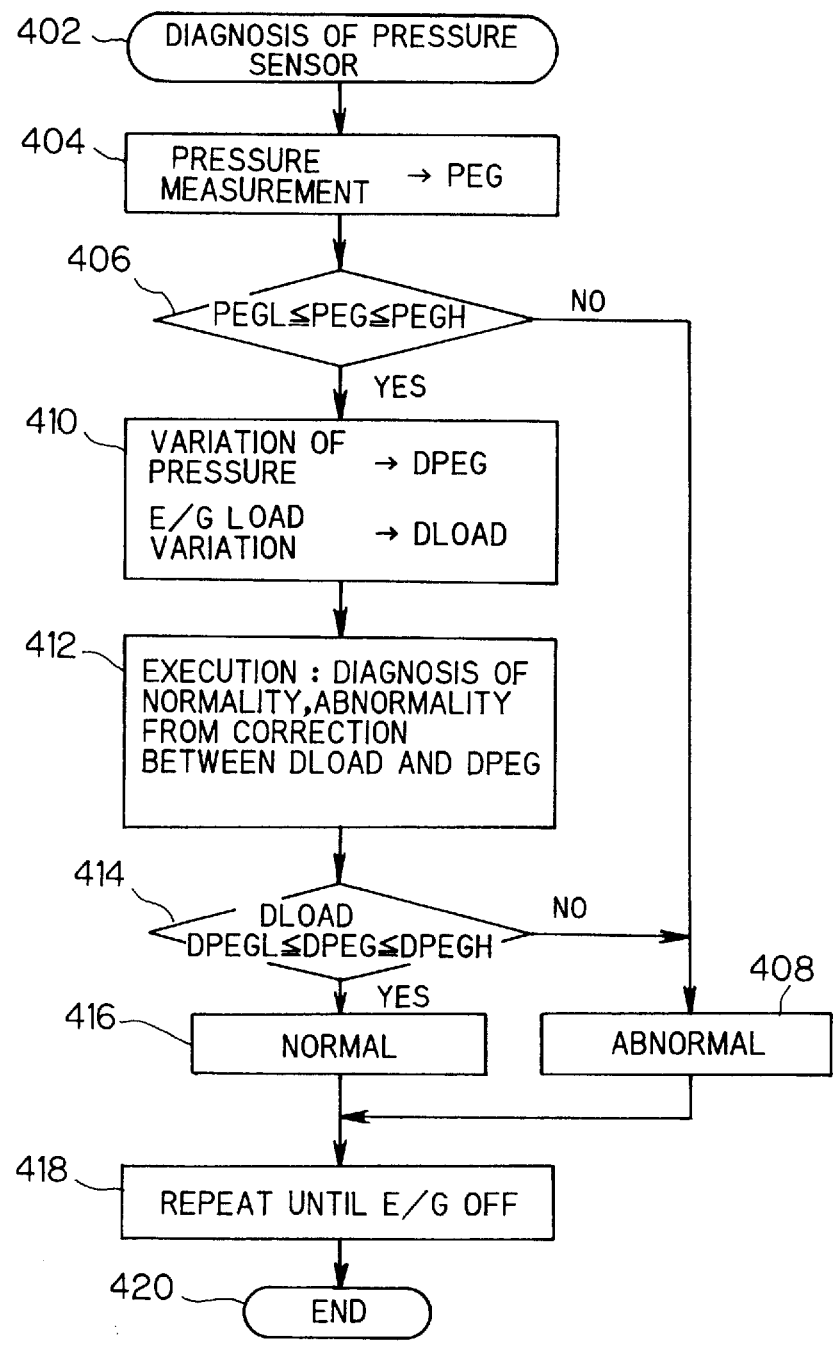
FIG. 7 is a flow chart illustrating a first example of diagnosing the relative pressure sensor.

The diagnosis of the relative pressure sensor 68 in Example 1 is done according to the flow chart shown in FIG. 7. When the diagnosis of the relative pressure sensor 68 starts (step 402), an intake manifold pressure (PEG) is measured (step 404). And, whether or not the intake manifold pressure (PEG) is within the criteria is judged (step 406).

Figure 8:
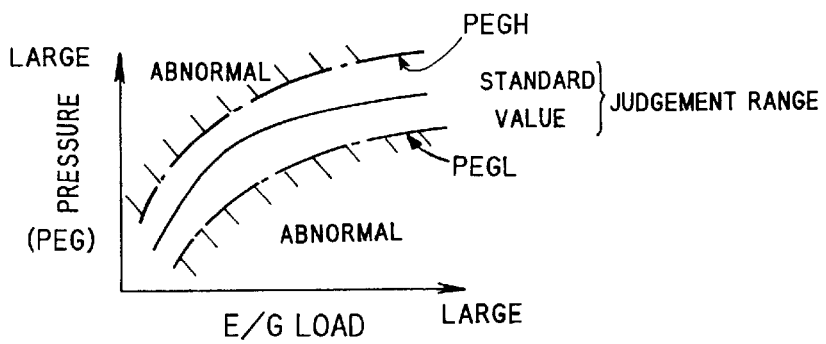
FIG. 8 is an illustration showing a relationship between an engine load and an intake pressure.

As shown in FIG. 8, the criterion of the intake manifold pressure (PEG) is dependent on the load of the internal combustion engine 2 and is determined by the higher criterion (PEGH) and the lower criterion (PEGL), and the area (i.e., the criterion range) between the higher and the lower criterion is judged as normal. The data in FIG. 8 is acquired at a constant engine speed of 1500 rpm. In the middle of the area between the higher criterion (PEGH) and the lower criterion (PEGL), a standard value is determined. That is, when the engine speed is constant, the correlation between the engine load and the intake manifold pressure (PEG) comes in a region between the higher criterion (PEGH) and the lower criterion (PEGL), deviated from the standard value due to the characteristic dispersion of the relative pressure sensor 68.

Figure 9:
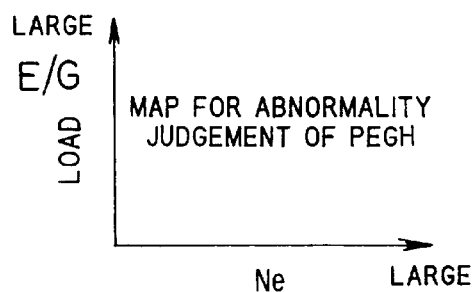
FIG. 9 is an illustration showing a relationship between an engine speed and the engine load.
Figure 10:
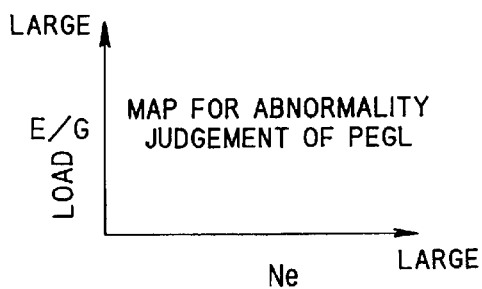
FIG. 10 is an illustration showing a relationship between the engine speed and the engine load.

Although the higher criterion (PEGH) and the lower criterion (PEGL) are set in a judgment map by means of the intake manifold pressure and the engine load in FIG. 8, an abnormality judgment map for the higher criterion (PEGH) is expressed by means of the engine speed (Ne) and the engine load (FIG. 9), and an abnormality judgment map for the lower criterion (PEGL) is expressed by means of the engine speed (Ne) and the engine load (FIG. 10).

If PEGL≦PEG≦PEGH is not satisfied at step 406, this step gives a NO result and diagnoses the relative pressure sensor 68 to be disconnected and/or short-circuited, and step 408 judges it as abnormal.

Figure 11:
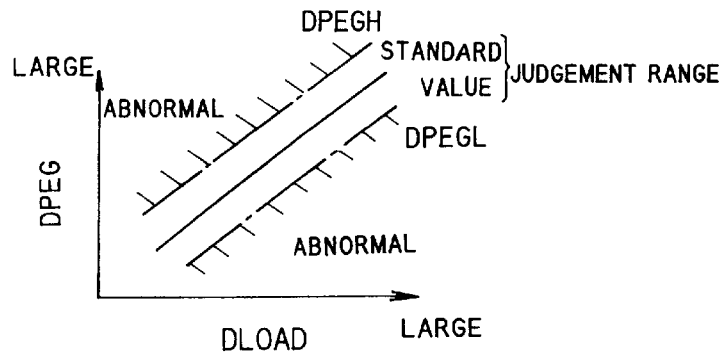
FIG. 11 is an illustration showing a relationship between respective variation amounts of the engine load and intake pressure.

If PEGL≦PEG≦PEGH is satisfied at step 406 and this step gives a YES result, a variation of the intake manifold pressure (DPEG) and a variation of the engine load (DLOAD) are measured (step 410). Based on a correlation map as shown in FIG. 11 relating to the variation of the intake manifold pressure (DPEG) against the variation of the engine load (DLOAD), the diagnosis of normality and/or abnormality of the functional relative pressure sensor 68 is executed (step 412). In FIG. 11, the failure of the relative pressure sensor 68 is diagnosed depending on whether the variation of the intake manifold pressure (DPEG) against variation of the engine load (DLOAD) is within the normal judgment range. The normal judgment range is set between the higher criterion (DPEGH) and the lower criterion (DPEGL). A standard value is set in the middle of the higher criterion (DPEGH) and lower criterion (DPEGL) judgment range.

The step 414 judges whether the variation of the intake manifold pressure (DPEG) against the variation of the engine load (DLOAD) is satisfied with DPEGL≦DPEG≦DPEGH. If step 414 gives NO, then step 408 judges the function of the relative pressure sensor 68 as abnormal. If step 414 gives YES, the next step 416 judges the relative pressure sensor 68 as normal.

After steps 408 and 416 judge the abnormality and normality of the relative pressure sensor 68, this program is repeatedly executed until the internal combustion engine 2 stops (step 418), and step 420 ends the program.

In Example 1 of the diagnosis of the relative pressure sensor 68, although the output voltage of the relative pressure sensor 68 is normal, the pressure characteristics of the relative pressure sensor 68 are not normal is judged on the basis of the variation of the intake manifold pressure (DPEG). The relation between the variation of the engine load (DLOAD) and the variation of the intake manifold pressure (DPEG) is shown in FIG. 11. The values of the higher criterion (DPEGH) and the lower criterion (DPEGL) are obtained by respectively adding and subtracting a variation factor to the intake manifold pressure, for example 0.8 (±0.8), the range therebetween being the dispersion or variation of the characteristics of the relative pressure sensor 68 relative to the standard value. If the variation of the intake manifold pressure (DPEG) against the variation of the engine load (DLOAD) is out of the range DPEGL≦DPEG ≦DPEGH, the function of the relative pressure sensor 68 judged as abnormal.

Figure 12:
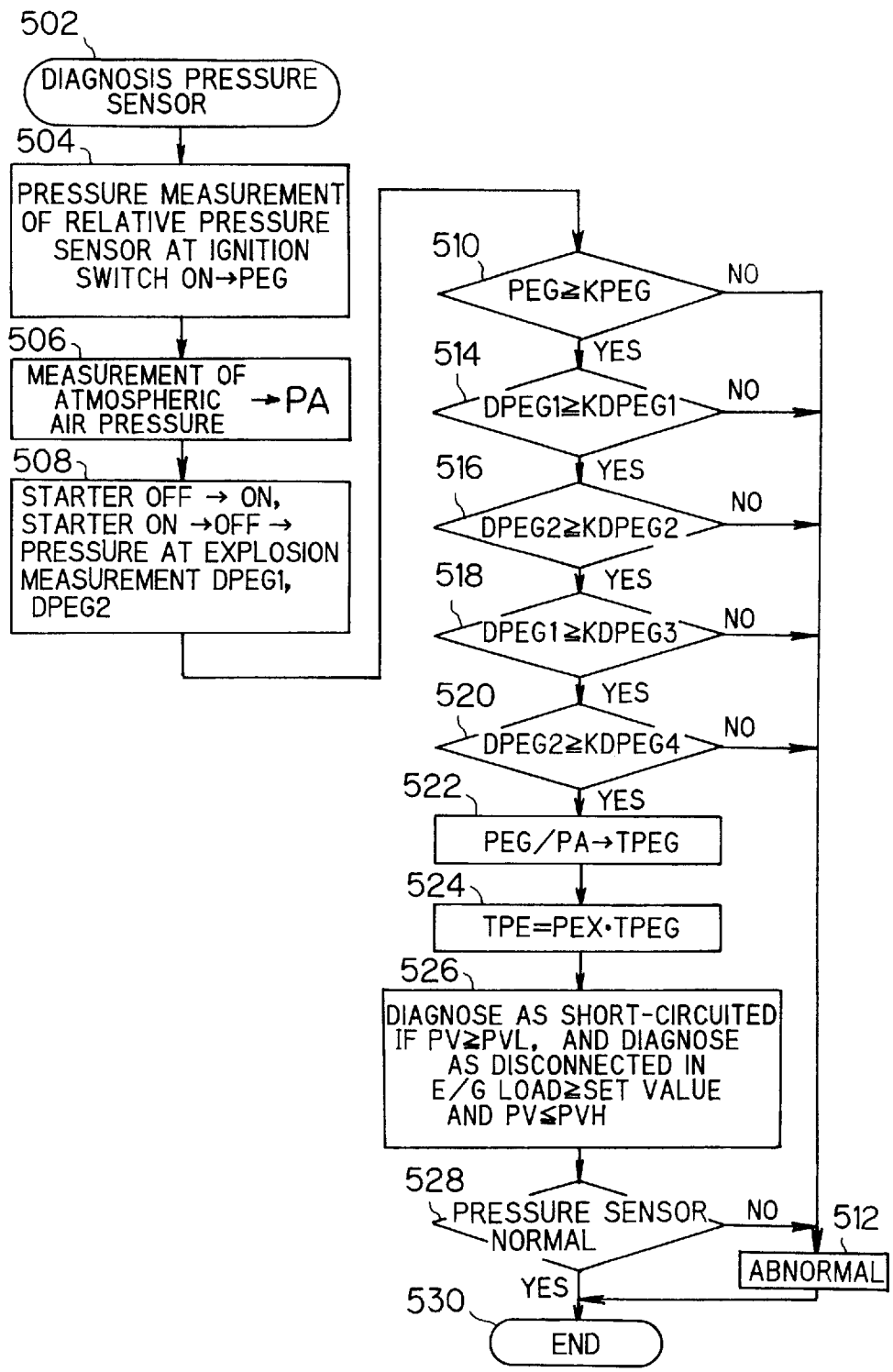
FIG. 12 is an illustration showing a second example of diagnosing the relative pressure sensor.
Figure 13:
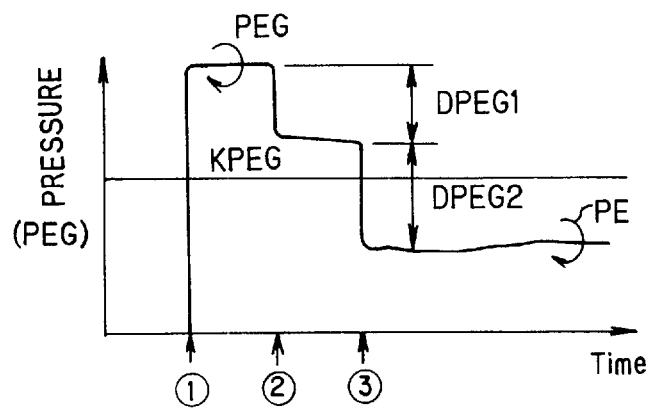
FIG. 13 is an illustration showing a relationship between pressure values and the operating state of the engine, more specifically intake manifold pressure (PEG) as a function of time including ignition switch on (1), starter switch-on (2), and exhaust gas start (3) times.
Figure 14:
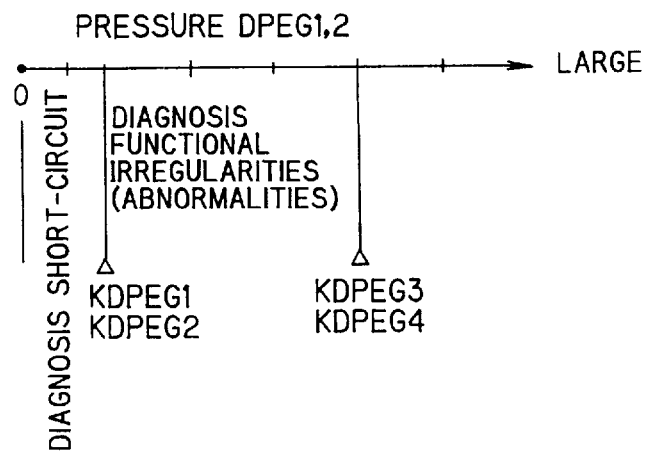
FIG. 14 is an illustration showing a diagnosis of failure in the relative pressure sensor.

Furthermore, the diagnosis of the relative pressure sensor 68 in Example 2 is performed according to the flow chart in FIG. 12. In FIG. 12 "PE" is the input pressure of the pressure sensor and "TPE" is the corrected input pressure. If the program of diagnosing the relative pressure sensor 68 starts (step 502), first, as shown in FIG. 13 and 14, the intake manifold pressure (PEG) is measured when the ignition switch 94 is turned ON (step 504) as indicated at "1" in FIG. 13; and the atmospheric air pressure (PA) is measured (step 506). The intake manifold pressure when the ignition switch 94 is turned ON is equivalent to the atmospheric air pressure because the internal combustion engine 2 is not yet started.

A first pressure (DPEG1) when the starter 96 is turned from OFF to ON is measured, and a second pressure (DPEG2) is measured at a complete explosion when the starter 96 is turned from ON to OFF (step 508) as indicated at "2" in FIG. 13.

The step 510 judges whether PEG ≧KPEG is satisfied; where KPEG is a criterion reference for the intake manifold pressure (PEG). If step 510 gives a NO result, it shows that the intake manifold pressure (PEG) is lower than the criterion reference (KPEG); and step 510 diagnoses the relative pressure sensor 68 as disconnected, and step 512 indicates it as abnormal.

If step 510 gives a YES result, the first pressure (DPEG1) is compared with the first criterion reference (KDEG1) (FIG. 13), and whether DPEG1≧KDPEG1 is met is diagnosed (step 514).

If step 514 gives a NO result, it shows that the first pressure (DPEG1) is lower than the first criterion reference (KDPEG1); and step 514 diagnoses the relative pressure sensor 68 as short-circuited, and step 512 indicates it as abnormal.

If step 514 gives a YES result, the second pressure (DPEG2) is compared with the second criterion reference (KDPEG2) (FIG. 13), and whether DPEG2≧KDPEG2 is met is diagnosed (step 516). If step 516 gives NO, it shows that the second pressure (DPEG2) is lower than the second criterion reference (KDPEG2); and step 516 diagnoses the relative pressure sensor 68 as short-circuited, and step 512 indicates it as abnormal.

If step 516 gives a YES result, the first pressure (DPEG1) is compared with a third criterion reference (KDPEG3) (FIG. 14); and whether DPEG1≧KDPEG3 is met is diagnosed (step 518). If step 518 gives NO, it shows that the first pressure (DPEG1) is lower than the third criterion reference (KDPEG3); and step 512 indicates the relative pressure sensor 68 as functionally abnormal.

If step 518 gives YES, the second pressure (DPEG2) is compared with a fourth criterion reference (KDPEG4) (FIG. 14); and whether DPEG2≧KDPEG4 is met is diagnosed (step 520). If step 520 gives NO, it shows that the second pressure (DPEG2) is lower than the fourth criterion reference (KDPEG4); and step 512 indicates the relative pressure sensor 68 as functionally abnormal.

If step 520 gives YES, a correction factor (TPEG) is acquired from the intake manifold pressure (PEG) divided by the atmospheric air pressure (PA) (step 522).

Figure 15:
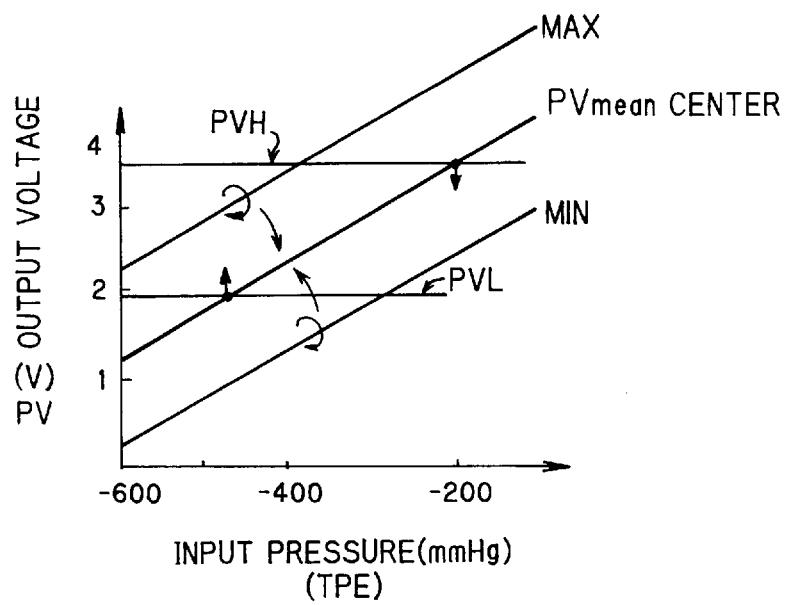
FIG. 15 is an illustration, showing a relationship between an input pressure and an output voltage.

The corrected input pressure (TPE) is acquired from input pressure (PE) of the relative pressure sensor 68 correction factor (TPEG) (step 524). The correction factor (TPEG) is stored in a backup memory when the ignition switch 94 is turned ON, and is statistically processed in the form of TPEG=TPEG old·coefficient (for example, 0.9)+TPEG new·coefficient (for example, 0.1). Here, "TPEG old" is a previous correction factor, "TPEG new" is a present correction factor, and the coefficients 01.9 and 0.1 are a type of annealing coefficient. By means of the correction factor (TPEG) obtained by an atmospheric air pressure (PA) and the relative pressure (PE) after a complete explosion of the internal combustion engine 2, the relative pressure (PE) is converted into an absolute pressure (TPE); as shown in FIG. 15, the pressure characteristics shown in FIG. 17, 18 are corrected into the "design center" rating.

The output voltage (PV) of the relative pressure sensor 68 during the time that the internal combustion engine 2 is not supplied with fuel within the combustion chamber is compared with the higher criterion (PVH) and the lower criterion (PVL) of the judgment range (step 526) while the engine is running. In this judgment range, as shown in FIG. 15, the output voltage (PV) against the input pressure (TPE) is illustrated, the higher criteria (PVH) and the lower criterion (PVL) are set, and the "design center" rating is determined in the middle of the range between the maximum value (MAX) and the minimum value (MIN), and thereby the dispersion of the characteristics of the relative pressure sensor 68 can be corrected into the design denter (PVmean) by the correction factor (TPEG). The step 526 is to diagnose abnormalities of the relative pressure sensor 68 during running in a short period, during the time that the engine is not supplied with fuel if PV≦PVL is met, the relative pressure sensor 68 is diagnosed as short-circuited. Furthermore, an operational condition of the engines are, when the engine integrated load (KLOAD)≧the criterion of the integrated load (KLOAD1) is met, and the output voltage (PV)≦the higher criterion (PVH) is met, the relative pressure sensor 68 is diagnosed as disconnected.

And, the step 528 diagnoses whether the relative pressure sensor 68 is normal or not. If step 528 gives NO, the step 512 judges the relative pressure sensor 68 as abnormal. If step 528 gives YES, the relative pressure sensor 68 is normal, and step 530 ends the program.

Still, if step 512 judges the relative pressure sensor 68 as abnormal, step 530 ends the program.

Figure 16:
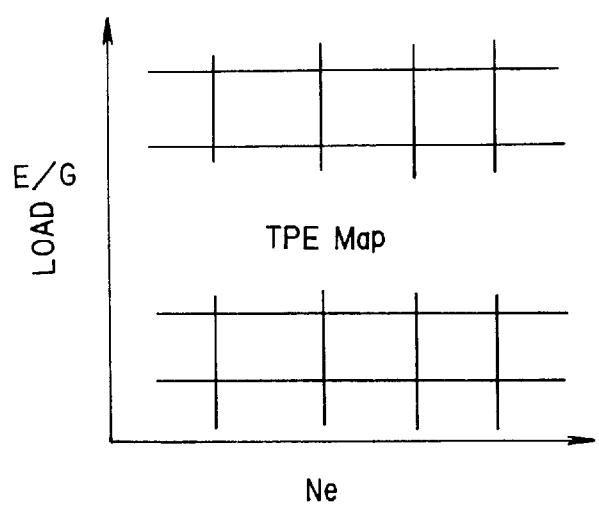
FIG. 16 is an illustration, showing a relationship between the engine speed and the engine load.

Furthermore, in the diagnosis of the relative pressure sensor 68, as shown in FIG. 16, by means of the engine speed (Ne) and engine load (KLOAD), the design center of the corrected input pressure (TPE) can be set by the map in FIG. 16; and it is possible to diagnose that the relative pressure sensor 68 is functionally abnormal, when the corrected input pressure (TPE) corresponding to the engine speed (Ne) and the engine load (KLOAD) is higher than TPE±a specific error value (X), for example ±100 mmHg.

Therefore, according to Example 2 of the diagnosis of the relative pressure sensor 68, the relative pressure sensor 68 can be diagnosed as disconnected or short-circuited depending on variation of the intake manifold pressure when the ignition switch 94 is turned ON, the functional abnormality can be diagnosed, and the relative pressure sensor 68 can be diagnosed even when an abnormality occurs when the engine is running after the internal combustion engine starts.

Next, in FIG. 1, step 114 judges whether the relative pressure sensor 68 is normal or not. If step 114 gives a NO result, an abnormality display unit such as a lamp (not illustrated) is illuminated to inform the abnormality of the relative pressure sensor 68 (step 116).

On the other hand, if step 114 gives YES, the next step 518 diagnoses the EGR system. If step 120 gives NO, then step 116 displays an abnormality. If step 120 gives YES and step 116 finishes the process, then step 122 ends the program.

According to this embodiment, the relative pressure sensor 68 can precisely be diagnosed from the states of the intake air temperature and the engine load to determine the abnormality such as disconnection or short-circuit, or the functional abnormality thereof.

Furthermore, the system according to this embodiment does not involve an incorrect abnormality judgment of the relative pressure sensor 68 due to frozen moisture in a hose communicating the relative pressure sensor 68 with the intake system, which can happen in an extremely cold region, or a wrong abnormality diagnosis of the EGR system and the like in which the relative pressure sensor 68 is used. Therefore, confusion regarding maintenance and users' perplexity can be avoided.

Still further, the system facilitates a precise diagnosis, and it can remove users' distrust due to a wrong diagnosis and eliminate performance of unnecessary maintenance work.

The above method is performed in a suitable electronic device adapted to receive the appropriate input signals, perform the comparisons and output a corresponding result signal. Examples of the suitable electronic device are integrated circuits or electronic circuitry.

As clearly understood from the detailed description hereinabove, it is possible to precisely diagnose abnormalities of the pressure sensor, avoid a wrong abnormality diagnosis, eliminate users' perplexity and confusions on maintenance, remove users' distrust, and eliminate unnecessary maintenance, by installing the control means diagnosing the pressure sensor to be in a failure when the intake air temperature is in a state of being measured and the integrated load of the internal combustion engine from its starting exceeds the criterion of the integrated load.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A failure diagnosis controller of a pressure sensor for measuring an intake manifold pressure of an internal combustion engine, including the pressure sensor measuring the intake manifold pressure, means for measuring intake air temperature and means for measuring engine load, comprising the improvement wherein the failure diagnosis controller is provided with a control means for diagnosing the pressure sensor to be in a failure mode when an intake air temperature is in a state of being measured and an integrated load of the internal combustion engine from a start thereof exceeds a criterion of the integrated load.

2. A failure diagnosis controller according to claim 1, wherein the control means diagnoses that the pressure sensor is in a disconnected or short-circuited mode when the intake manifold pressure is not within a criterion range between a higher limit and a lower limit criteria, and diagnoses that the pressure sensor is in a functional abnormality mode when a pressure variation compared against an engine load variation is outside of a criterion.

3. A failure diagnosis controller according to claim 1, wherein the control means receives the measured intake manifold pressure from the pressure sensor when an ignition switch is ON, measures an atmospheric air pressure, measures a first pressure when a starter turns to ON from OFF, measures a second pressure at a complete explosion when the starter turns to OFF from ON, diagnoses that the pressure sensor is in a disconnected mode when the intake manifold pressure is lower than a reference criterion, diagnoses that the pressure sensor is in a short-circuited mode when the first pressure is lower than a first criterion or the second pressure is lower than a second criterion, diagnoses that the pressure sensor in a functionally abnormal mode when the first pressure is lower than a third criterion or the second pressure is lower than a fourth criterion, sets a correction factor on the basis of the intake manifold pressure and the atmospheric air pressure, sets a corrected input pressure on the basis of an input pressure of the pressure sensor and the correction factor, diagnoses that the pressure sensor is in a short-circuited mode when an output voltage is higher than a lower limit for judgment while the fuel is not supplied, and diagnoses that the pressure sensor is in a disconnected mode when an engine load is higher than a set value or the output voltage is lower than a higher limit for judgment.

4. A failure diagnosis controller according to claim 1, wherein the control means measures the intake air temperature when a vehicle speed continues for a specific length of time or more with a set vehicle speed, measures the intake air temperature each time when the vehicle speed continues for the specific length of time or more with the set vehicle speed, and performs a statistical processing of the intake air temperature.

5. A failure diagnosis controller according to claim 1, wherein the control means delays a diagnosis of the pressure sensor from the starting of the internal combustion engine depending on the integrated load, and varies the criterion of the integrated load according to the intake air temperature.

6. A process for determining an abnormal operation or failure of a pressure sensor in an internal combustion engine, the pressure sensor being adapted to measure intake manifold pressure, comprising the steps of measuring intake air temperature, measuring the load of the engine, integrating the measured load, measuring intake manifold pressure and then initiating diagnoses for failure of the pressure sensor when performing the intake air temperature measurement and when the integrated load exceeds an integrated load criterion.

7. The process according to claim 6, wherein the step of measuring intake air temperature includes the steps of measuring vehicle speed, testing vehicle speed to satisfy vehicle speed exceeds a set vehicle speed for at least a specific length of time, and statistically processing the intake air temperature when the vehicle speed exceeds the set vehicle speed for at least the specific length of time.

8. The process according to claim 6, wherein the step of diagnosing the failure of the pressure sensor includes the step of varying the integrated load criterion in response to the intake air temperature.

9. A process for determining an abnormal operation or failure of a pressure sensor in an internal combustion engine, comprising the steps of:

measuring intake air temperature, measuring the load of the engine, integrating the measured load, measuring the intake manifold pressure, diagnosing the failure of the pressure sensor when performing the intake air temperature measurement and when the integrated load exceeds an integrated load criterion, and detecting the abnormal operation of the pressure sensor when the measured intake manifold pressure is outside a first criterion range.

10. The process according to claim 9, further comprising the steps of determining an intake pressure variation and engine load variation, and diagnosing the abnormal operation of the pressure sensor when the intake pressure variation compared to the engine load variation is outside a select criterion.

11. The process according to claim 9, wherein the steps of measuring intake manifold pressure is performed when the ignition switch is turned ON then measuring a first pressure, measuring a second pressure when the starter is turned OFF after an explosion in an engine cylinder at a complete engine cycle, and further comprising the steps of diagnosing the pressure sensor as disconnected when the intake manifold pressure is lower than a first criterion, diagnosing the pressure sensor as short-circuited when the first pressure is lower than a second criterion or the second pressure is lower than a third criterion, and diagnosing the pressure sensor as functionally abnormal when the first pressure is lower than a fourth criterion or the second pressure is lower than a fifth criterion.

12. The process according to claim 11, further comprising the steps of measuring the atmospheric air pressure, calculating a corrected input pressure from the measured intake manifold pressure and the measured atmospheric air pressure, calculating a corrected input pressure from the input pressure of the pressure sensor and the calculated correction factor, diagnosing the pressure sensor as short-circuited when an output voltage from the pressure sensor is higher than a lower limit for judgment when fuel is not supplied to the engine cylinder, and diagnosing the pressure sensor as disconnected when the engine load is greater than a set value or the output voltage is lower than a higher limit for judgment.

13. The process according to claim 9, wherein the steps of diagnosing the failure or abnormal operation of the pressure sensor include the step of delaying the diagnosis of the pressure sensor from a start of the engine depending upon the integrated load.

* * * * *